United States Patent [19]

Thacker

[11] Patent Number: 5,313,501
[45] Date of Patent: May 17, 1994

[54] METHOD AND APPARATUS FOR DESKEWING DIGITAL DATA

[75] Inventor: Charles P. Thacker, Palo Alto, Calif.

[73] Assignee: Digital Equipment Corporation, Maynard, Mass.

[21] Appl. No.: 898,335

[22] Filed: Jun. 15, 1992

[51] Int. Cl.$^5$ ............................................. H04L 25/38
[52] U.S. Cl. ..................................... 375/117; 375/118; 307/602; 371/1
[58] Field of Search ................. 375/117, 118, 107, 106; 307/262, 269, 602, 590; 328/55, 755; 371/1

[56] References Cited

U.S. PATENT DOCUMENTS

| | | | |
|---|---|---|---|
| 3,518,625 | 6/1970 | Agin | 371/1 |
| 4,637,018 | 1/1987 | Flora et al. | 328/55 |
| 4,700,347 | 10/1987 | Rettberg et al. | 371/1 |
| 4,755,704 | 7/1988 | Flora et al. | 375/107 |
| 4,841,551 | 6/1989 | Avaneas | 375/118 |
| 4,977,582 | 12/1990 | Nichols et al. | 375/118 |

Primary Examiner—Stephen Chin
Assistant Examiner—Tesfaldet Bocure
Attorney, Agent, or Firm—Flehr, Hohbach, Test, Albritton & Herbert

[57] ABSTRACT

In a computer system, parallel streams of digital data are transmitted from a source to a destination in bursts or packets. At the beginning of each burst all the parallel data signals contain a start bit. Each data signal is received by a deskewing buffer which transmits the data signal through a delay line with multiple taps. At the beginning of each clock cycle the signal value Data(i) at each tap (i) in the delay line is latched. Each resulting latched signal value LData(i) is compared with the latched signal value LData(i+1) for the next tap down the delay line to generate a set of comparison signals C(i). When the start bit of a new burst is received, one of the comparison signals will have a distinct value from all the others, thereby indicating the delay line tap at which the phase of the received data signal is approximately synchronized with the receiver's clock signal. The data stored in the deskewing buffer's latches represents the phase of the received digital signal and is retained until the end of the burst transmission. A multiplexer which outputs a selected one of data signals from the tapped delay line in accordance with the values of the comparison signals. The selected data signal is sampled and latched at each clock cycle, thereby generating a deskewed data signal that is synchronized with both the receiver's clock signal and also with the other parallel data streams.

4 Claims, 3 Drawing Sheets

METHOD AND APPARATUS FOR DESKEWING DIGITAL DATA

The present invention relates generally to systems in which streams of digital data are transmitted over parallel communication paths with differing amounts of propagation delay, and particularly to methods and apparatus for deskewing such streams of digital data at a receiving station so that parallel bits of data are received simultaneously from the parallel data streams.

BACKGROUND OF THE INVENTION

Referring to FIG. 1, many digital systems have data busses and other data communication lines which contain many parallel communication paths. For instance, a typical cable that carries data between a computer and its printer will have sixteen or more parallel data lines as well as a number of parallel control signal lines. Parallel data lines are frequently used simply because it is possible to transmit data much faster over N parallel lines than over a single data line.

In many cases, parallel streams of data are transmitted from a source to a destination over a path in which the delays to which the parallel bit streams are subjected cannot be accurately controlled. Variable delays are introduced not only by differing lengths of the signal paths, but also by variations in the delay of drivers and receivers. In order for the receiver at the destination to accurately recover the data the individual data bits must be sampled by a clock at the receiver. This clock can have the same frequency as the transmitter, but the transmitter and receiver will not necessarily have the same phase, further exacerbating the problem of correctly receiving the data.

The need for deskewing parallel bit streams increases as the transmission speed from source to destination is increased because the differences in propagation delays between parallel lines becomes a more significant fraction of the time window in which the data must be sampled. For instance, if the maximum difference in propagation delays of a set of parallel communications paths is four nanoseconds, equivalent to 0.04 clock periods when transmitting at a rate of 10 Megabits per second, that same maximum difference in propagation delays is equivalent to 0.5 clock periods when transmitting at a rate of 125 Megabits per second.

The need for deskewing also increases as the differences in delay of the signal drivers and receivers for each bit increase relative to the period of the system's clock. This problem is particularly acute when a manufacturing technology such as CMOS is used for drivers and receivers, since it is difficult to produce a number of circuits with identical delays using that manufacturing technology.

FIG. 1 shows a "snap shot" representation of a set of parallel bits being transmitted at the source, and a representation of the same bits at the input port of the destination. The function of the deskewing buffers of the present invention is to convert the received, skewed streams of digital data into deskewed streams, and also to adjust these streams of data so that each bit is accurately sampled by a defined clock signal at the receiver.

SUMMARY OF THE INVENTION

In summary, the present invention is a circuit and method for deskewing parallel streams of digital data transmitted from a source to a destination. The digital data is transmitted in bursts. All the parallel transmitted digital data signals have a predefined quiescent value (e.g., zero volts) between transmission bursts. Furthermore, all the parallel transmitted digital data signals contain an identical first bit, called a start bit, which is the opposite of the quiescent value, at the beginning of each burst.

At the destination, each data signal is received by a deskewing buffer which transmits the data signal through a delay line with multiple taps. At the beginning of each clock cycle that occurs between bursts, the signal value Data(i) at each tap (i) in the delay line is latched, resulting in latched data signals LData(i). Then each latched signal value LData(i) is compared with the neighboring latched signal value LData(i+1) for the next tap down the delay line to generate a set of comparison signals C(i). Between data bursts, all the data signals are identical and the comparison signals are all the same. When the start bit of a new burst is received, one of the comparison signals will have a distinct value from all the others, thereby indicating the delay line tap at which the phase of the received data signal is approximately synchronized with the receiver's clock signal. Thus, each delayed digital signal in the tapped delay line is repeatedly (once each clock cycle) compared with a neighboring delayed digital signal from the same tapped delay line so as to detect a signal transition indicative of the start bit.

When a start bit is received, the data stored in the data latches in the deskewing buffer representing the phase of the received digital signal is retained until the end of the burst transmission. The deskewing buffer also contains a multiplexer which outputs a selected one of data signals from the tapped delay line in accordance with the values of the comparison signals. The selected data signal is sampled and latched at each clock cycle, thereby generating a deskewed data signal.

The deskewed data signals output from the parallel deskewing buffers are approximately synchronized with the receiver's clock signal and are also synchronized with each other.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
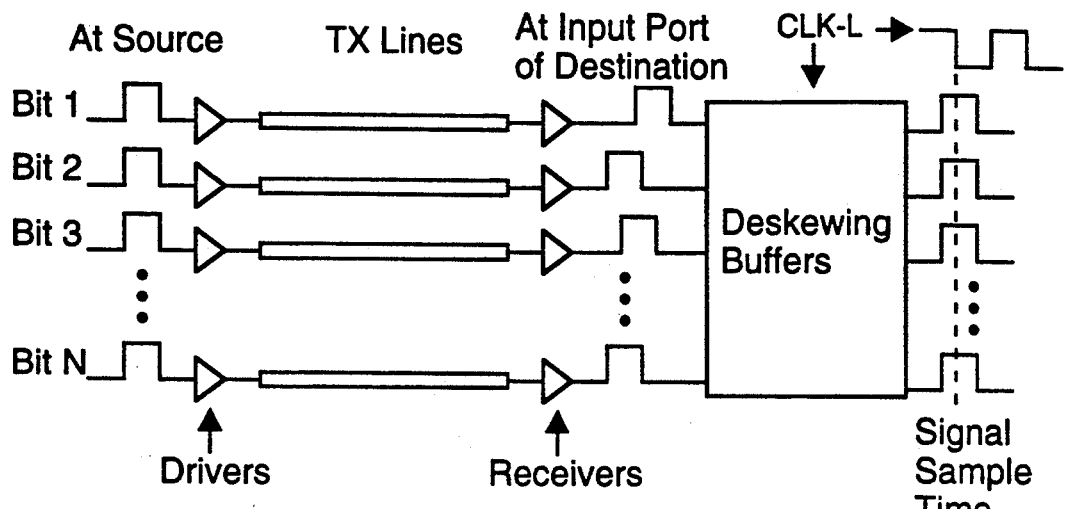
FIG. 1 is a block diagram of a set of parallel transmission lines with different propagation delays, and a set of deskewing buffers.
Figure 2:
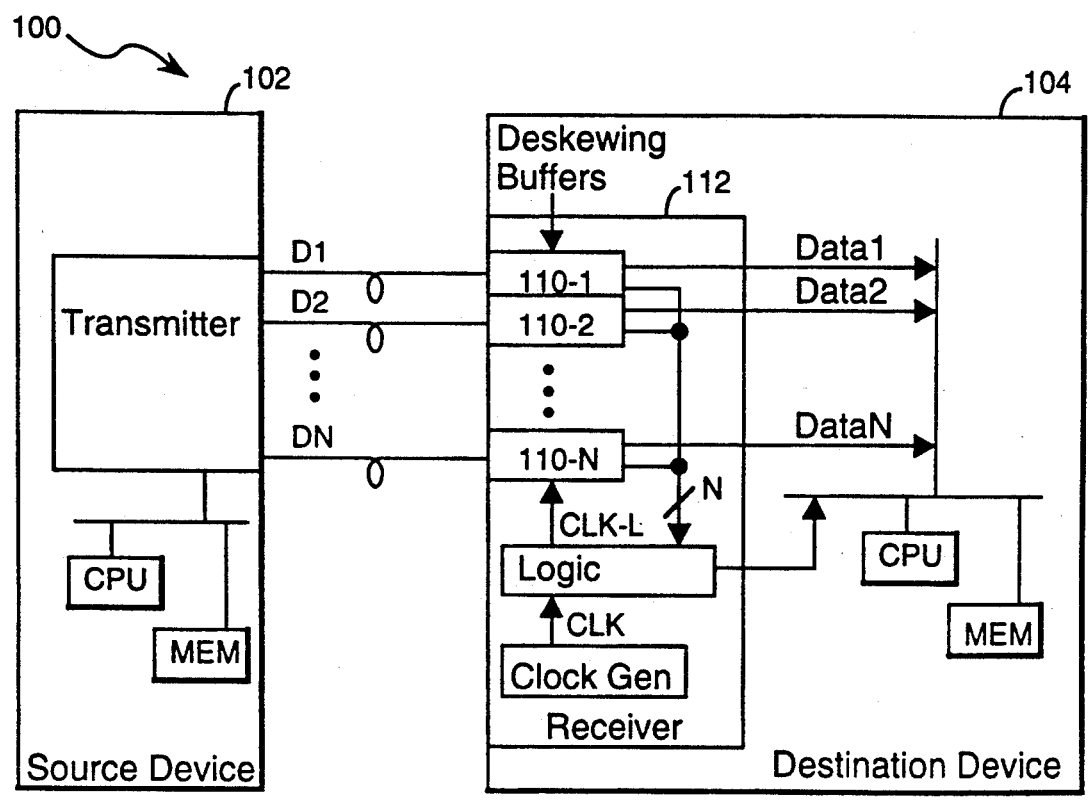
FIG. 2 is a block diagram of two digital data processing systems with a transmission line for sending digital data over parallel paths from the first system to the second system.

Referring to FIG. 2, there is shown a system 100 in which N (e.g., thirty-two) parallel streams of digital data are transmitted from a source device 102 to a destination device 104. Typically, both the source and destination devices are digital data processing devices or systems, such as two computers.

In the preferred embodiment data transmission is not continuous, but instead data is transmitted in "bursts" or packets. An example might be a block of data from a memory, or a network packet. For the purposes of explaining the invention, we will assume that data transmission occurs at a rate of 100 Megahertz, with one set of 32 bits being transmitted over parallel communication paths D1 to DN every 10 nanoseconds until a full packet of information has been transmitted. The invention is not specific to any particular number of parallel signal paths nor to any specific transmission rate, both of which will vary from application to application.

All the parallel transmitted digital data signals have a predefined quiescent value (e.g., zero volts) between transmission bursts. Furthermore, all the parallel transmitted digital data signals contain an identical first bit, called a start bit, whose value is the opposite of the quiescent value, at the beginning of each burst. As described below, in some embodiments the start bit must be two clock periods long, while in other embodiments a start bit of one clock period is sufficient.

The transmission times associated with the various parallel communication paths D1 to DN are not necessarily uniform, causing the parallel data streams to become skewed with respect to one another. As a result, bits transmitted at the same time arrive at the receiver spread out in time. In a first preferred embodiment, it is assumed that the maximum skew between any two parallel data streams is no more than one clock period. In a second preferred embodiment discussed below, the maximum relative skew may exceed one clock period.

At the destination device 104, each data signal is received by a deskewing buffer 110 which is part of the device's data receiver circuit 112. The deskewing buffers 110-1 to 110-N delay the received data by a sufficient amount to align each data stream with the receiver's clock. The deskewed data signals output from the parallel deskewing buffers 110 are approximately synchronized with the receiver's clock signal and are also synchronized with each other, and are thus suitable for parallel transmission over data lines Data1 to DataN within the destination device 104, such as on an internal data bus.

Figure 3:
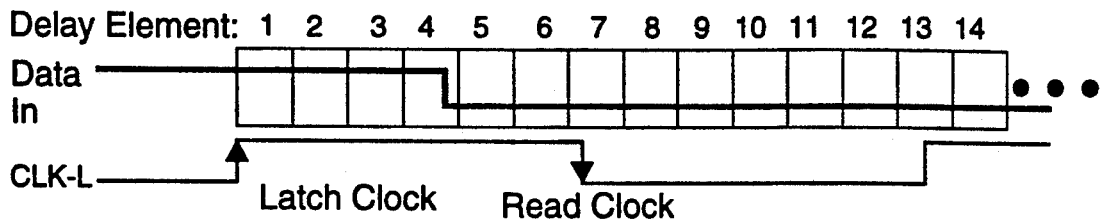
FIG. 3 represents an expanded view of a data signal as it travels through a chain of delay elements.

FIG. 3 shows a highly expanded view of a data signal as it travels through a chain of delay elements 1 to 15. This "snap shot" view is taken at the moment that the latch clock signal CLK-L transitions from low to high. If we assume that each delay element has an associated delay of about 0.8 nanoseconds, a delay chain of fifteen to twenty elements would have a total delay length of about 12 to 16 nanoseconds, or slightly longer than a ten nanosecond clock cycle. Note that the exact value of delay is not critical, nor is it necessary that all delays be identical. This is an important consideration for an implementation technology such as CMOS. Also shown in FIG. 3 is the receiver's clock signal, indicating that one clock cycle is equal in length to the transmission time through 12 to 13 delay elements. If we assume that the received data signal being shown is the start bit at the beginning of a data transmission burst, the signal value in delay elements 5 and thereafter represents the quiescent signal value before the start bit, and the signal value in delay elements 1 to 3 represents the signal value of the start bit, with delay element 4 being the transition point.

The purpose of the deskewing buffers is to add sufficient delay to align transitions in each data signal with the latch clock signal. In the example shown in FIG. 3, that would be accomplished by selecting the delayed signal output by delay element 4.

Figure 4:
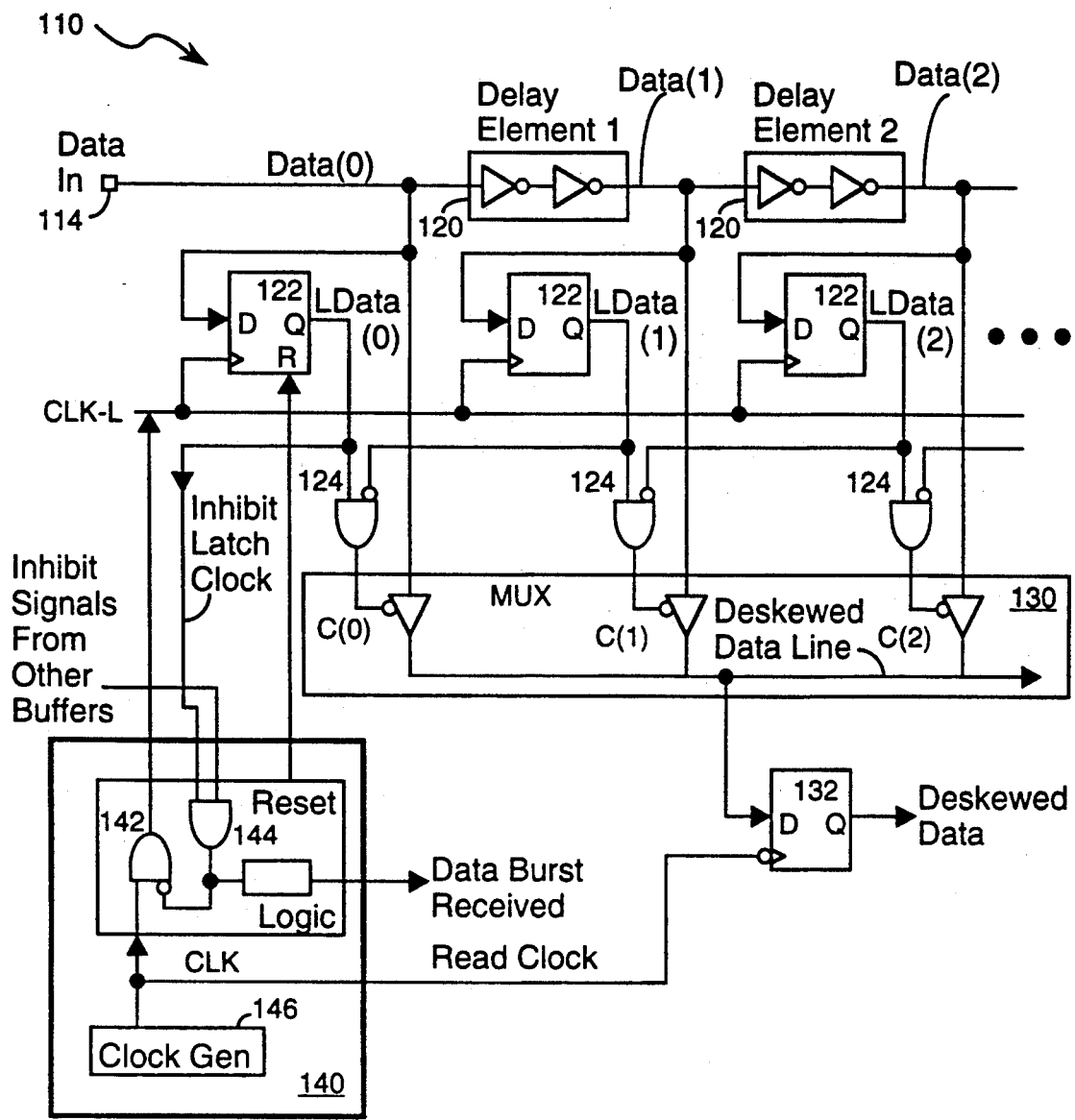
FIG. 4 is a block diagram of a first preferred embodiment of the digital data deskewing buffer of the present invention.

FIG. 4 shows the circuitry for one deskewing buffer 110. It should be remembered that N of these buffers are used in parallel, each to align a separate data stream with the receiver's clock as well as with the other digital signals. The deskewing buffer 110 receives the incoming digital signal at an input port 114 and transmits the received data signal through a delay line with multiple taps. The delay line is implemented as a chain of delay elements 120, with tap points located at the beginning of the delay line as well as after each of the delay elements. For data transmitted at 100 MHZ, the delay elements 120 are implemented using pairs of inverters, with each delay element having a delay of about 0.8 nanoseconds. In the first preferred embodiment the chain of delay elements has twenty elements, ensuring that the total delay through the chain is longer than one clock cycle. In general, the deskewing buffer will always have at least six delay elements in order to be able to locate the center of the received bits within a quarter of a clock cycle, and preferably the deskewing buffer will have at least ten delay elements, with at least eight delay elements per clock cycle in order to locate the bit center even more accurately.

At the beginning of each clock cycle, when the clock signal CLK-L transitions from low to high, the signal value Data(i) at each tap (i) in the delay line is latched by a D flip-flop 122, herein called a latch, generating latched data signals LData(i). The index i as used herein has values 0 to J, where J is the number of delay elements in the delay line. Each latched signal value LData(i), except for the last one at the end of the chain, is compared by an AND gate 124 with the latched signal value LData(i+1) for the next tap down the delay line to generate a set of comparison signals C(i). C(i) is equal to one only when the two compared latch signals have values of 1 and 0, respectively; otherwise C(i) is equal to zero.

Between data bursts, all the latched data signals LData(i) are equal to zero and the comparison signals C(i) are also all equal to zero. When the start bit of a new burst is received, the latches 122 contain a data pattern something like 111000000 . . . . Thus, at some point along the delay element chain there will be one-zero pattern in two adjacent latches. The corresponding comparison signal will have a distinct value (i.e., one) from all the others, thereby indicating the delay line tap at which the phase of the received data signal is approximately synchronized with the receive's clock signal. Thus the latched data in latches 122 represents the phase of the received data signal relative to the receive's clock signal CLK-L. A distributed multiplexer circuit 130 uses the comparison signals to select and output a selected one of data signals Data(i) from the tapped delay line in accordance With the values of the comparison signals. The selected data signal is sampled and latched at the middle of each clock cycle by a signal sampling latch 132, thereby generating a deskewed data signal.

In the preferred embodiment, the tap point selected by multiplexer 130 is at the transition point in the received signal. In other implementations, depending on the clock signals being used and known signal delays in the receiver circuit, the multiplexer might be designed to select a tap point a certain number of delay elements up or down the delay chain from the latched transition point in the received signal.

When the 111100000 . . . pattern is captured, only the latch that contains the rightmost "1" value (or the leftmost "0" value) can possibly enter a metastable state (as long as the delay introduced by each delay element 120 is greater than the latch's setup time or hold, which is generally easy to achieve). If the latch does end up in a metastable state, it has one clock period to exit the state (i.e., to become a stable 1 or 0). If the latch makes the "wrong" decision, it will cause the data to be sampled at the wrong time, but only by an amount equal to one inverter pair delay. Thus, the possibility of a latch metastable state will not cause a problem in practice, regardless of how the metastable state is exited.

Clock control circuit 140 is shared by all the deskewing buffers 110. When the first latch 122 in the delay chain of all the deskewing buffers contains a "1" bit, the latch clock CLK-L is inhibited by AND gate 142 for the duration of the data burst. The read clock signal CLK, generated by a clock generator circuit 146, is not inhibited. Since it is possible that the start bit at the beginning of a data burst might be received by less than all of the deskewing buffers 110 at the beginning of a particular clock period, an AND gate 144 is used to make sure that the start bit has arrived at all of the deskewing buffers before the latch clock signal is inhibited.

After the end of each data burst has been processed, and before the beginning of the next data burst, logic (not shown) in the clock control circuit 140 generates a Reset signal for clearing the latch 122 in each buffer 110 that stores the data sample used by circuit 140 to determine when to inhibit the latch clock signal. This Reset signal is needed so that production of the latch clock CLK-L can be restarted before arrival of the next data burst. Alternately, the Reset signal could be generated by data processing circuitry which recognizes the end of each data burst.

In the preferred embodiment the read clock signal CLK is identical in phase to the latch clock signal CLK-L, except for a one gate delay in the latch clock signal. In other embodiments, these two clock signals might have a different phase relationship, but in general the two clock signals will be synchronized.

To ensure that there is a point in time at which the first latch 122 in all the deskewing buffers 110 is equal to "1", the start bit must stay at a value of "1" for at least two clock cycles. Furthermore, to ensure that both the start bit and the maximum data skew be captured in the parallel deskewing buffers, the delay chains in the deskewing buffers must have a delay length equal to at least the maximum data skew plus one clock cycle plus one additional delay element. Thus, for a set of transmission paths with a maximum skew of 5 nanoseconds, and a signal clock cycle of 10 nanoseconds, the delay chain must have a delay length that is at least one delay element longer than 15 nanoseconds. Using delay elements with a delay of 0.8 nanoseconds, the delay chain must have at least 20 delay elements.

Alternately, the inhibit clock signal could be generated by ORing (in each deskewing buffer) latched data signals spaced at one clock period intervals LData(1), LData(1+J), LData(1+2J), and so on, where J is the number of delay elements corresponding to a delay of one clock cycle. The resulting signals from all the deskewing buffers would then be ANDed to generate the inhibit clock signal. Using this alternate circuit, the start bit can be just one clock cycle long.

Figure 5:
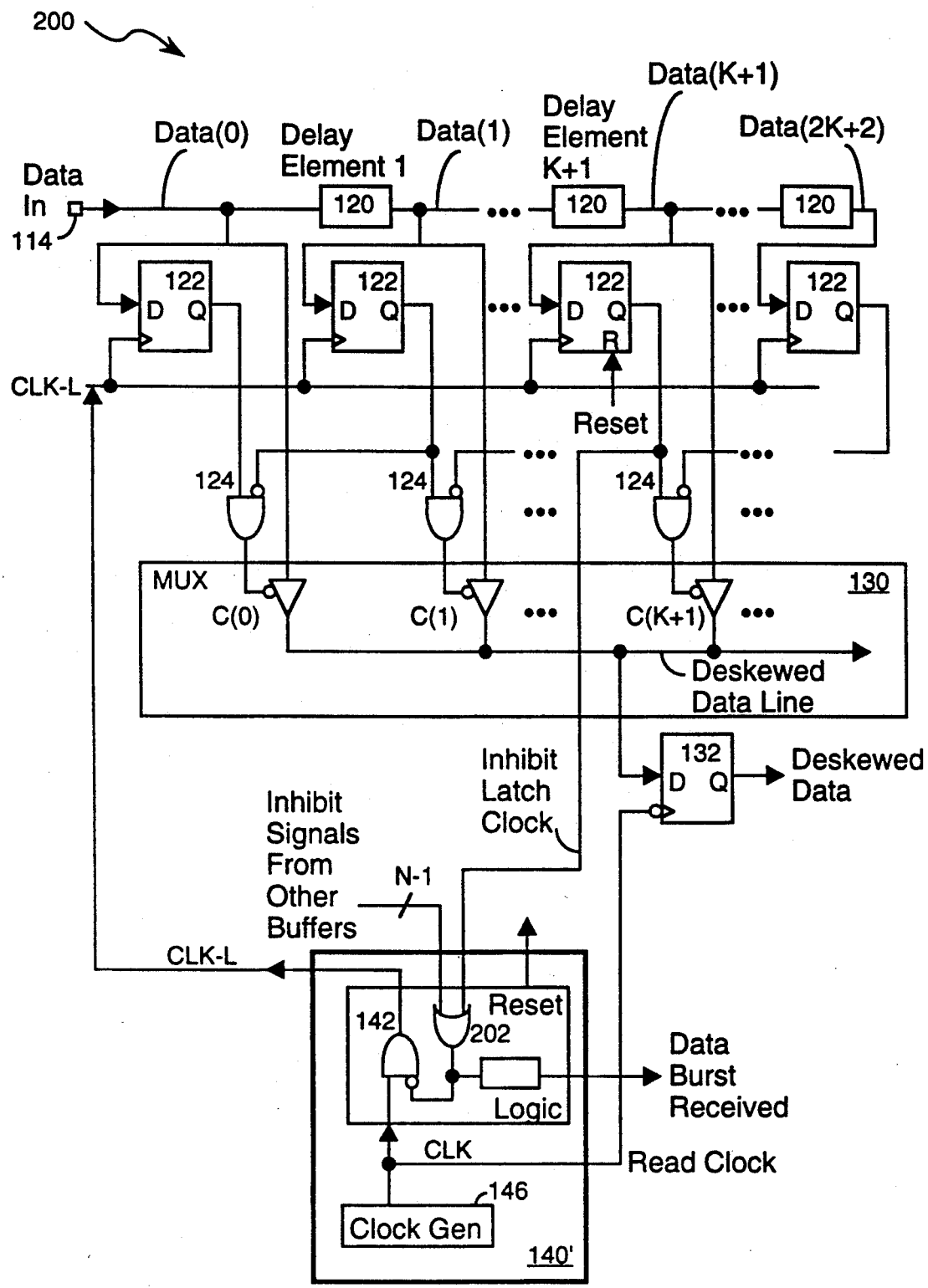
FIG. 5 is a block diagram of a second preferred embodiment of the digital data deskewing buffer of the present invention.

Referring to the receiver circuit 200 shown in FIG. 5, if the maximum signal skew is known to be equivalent to K delay elements, then the deskewing buffers can be built each with 2K+2 delay elements when K delay elements is longer than one clock cycle. The signal for inhibiting the latch clock is generated by ORing the latched data LData(K+1) from the K+1th tap points of the N deskewing buffers with an OR gate 202, as shown in FIG. 5. If K delay elements is shorter than one clock cycle, the deskewing buffer will need a length of one clock cycle plus K+1 delay elements (as was the case in FIG. 4, above), but the signal for inhibiting the latch clock is still generated by ORing the LDATA(K+1) latched data signals. In this embodiment 200, the start bit can be just one clock cycle long.

For situations in which the maximum signal skew is greater than one clock cycle, the length of the delay element chain is simply made as long as necessary. In the design used in FIG. 4, the delay chain must have a length equal to at least the maximum signal skew, plus one clock period plus one additional delay element.

In all of the embodiments, the start bit at the beginning of each transmission burst is used essentially as a calibration signal that allows the deskewing buffers to determine the amount of delay required for each individual data stream. The deskewed data signals output from the parallel deskewing buffers are synchronized with the receive's clock signal and are also synchronized with each other.

In the preferred embodiments, the deskewing buffers are implemented using a single integrated circuit. The components on the integrated circuit can be fabricated without tight control over the propagation delays of the circuits, because the deskewing circuits are essentially self calibrating. Also, no analog components such as phase-locked loops or adjustable delay elements are required. The present invention also avoids the need to transmit one or more clock signals with the data. While the present invention is transistor-intensive, it can still be fabricated inexpensively using available integrated circuit technology because the entire circuit can be implemented on, or as a portion of, a single integrated circuit.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A receiver circuit for deskewing N parallel digital data signals that are transmitted in bursts, each burst beginning with a predefined start bit in each said parallel digital data signal, the receiver circuit comprising:

a receiver clock circuit for generating a read clock signal;

N data ports for receiving said N parallel digital data signals, where N is a positive integer greater than one;

N tapped delay lines, each tapped delay line comprising a chain of delay elements through which said received digital data signal is transmitted, said chain of delay elements generating delayed digital signals at signal taps located after each of said delay elements;

comparison means for comparing each said delayed digital signal from each said tapped delay line with an immediately neighboring delayed digital signal from the same tapped delay line so as to detect a signal transition indicative of said start bit;

latch means, coupled to said receiver clock circuit and said tapped delay lines, for storing data corresponding to the signal tap at which said signal transition was located in each said tapped delay line at a predefined time during a cycle of said read clock signal;

a multiplexer, coupled to said comparison means and said tapped delay lines, that outputs one of said delayed digital signals from each of said tapped delay lines in accordance with said data stored by said latch means; and logic means for storing new data in said latch means as each new burst of digital data signals is received;

whereby said data signals output by the multiplexers are synchronized with said read clock signal and with each other.

2. A receiver circuit for deskewing N parallel digital data signals that are transmitted in bursts, each burst beginning with a predefined start bit in each said parallel digital data signal, the receiver circuit comprising:

a receiver clock circuit for generating a latch clock signal and a read clock signal that is synchronized with said latch clock signal;

N deskewing buffers, each buffer receiving a distinct one of said N parallel digital data signals, where N is a positive integer greater than one; each deskewing buffer comprising:

a data port for receiving one of said digital data signals;

a chain of J delay elements through which said digital data signal received by said data port is transmitted, said chain of J delay elements generating J delayed digital signals Data(i), for i=1 to J, at signal taps located after each of said delay elements;

a latch that latches said J delayed digital signals Data(i) at a predefined time during each cycle of said latch clock signal, thereby generating J latched digital signals LData(i);

a logic circuit coupled to said latch for comparing said latched digital signals LData(i) with the latched digital signals LData(i+1) for i=1 to J−1, generating J−1 comparison signals C(i); wherein when said predefined start bit is received and latched into said latch, one of comparison signals will have a predefined value distinct from all the other ones of said comparison signals; and a multiplexer which receives said data signals Data(i) and outputs one of said data signals Data(i) in accordance with the one of said comparison signals having said predefined value; and a latch clock inhibiting circuit for inhibiting generation of said latch clock signal after said predefined start bit has been received by all of said deskewing buffers;

whereby said data signals output by the multiplexers in said deskewing buffers are synchronized with said read clock signal and with each other.

3. A method of deskewing N parallel digital data signals that are transmitted in bursts, each burst beginning with a predefined start bit in each said parallel digital data signal, the steps of the method comprising:

generating a read clock signal;

receiving said N parallel digital data signals, where N is a positive integer greater than one;

transmitting each of said received N parallel digital data signals through a separate tapped delay line, each said chain of delay elements generating delayed digital signals at signal taps located after each of said delay elements;

comparing each said delayed digital signal from each said tapped delay line with an immediately neighboring delayed digital signal from the same tapped delay line so as to detect a signal transition indicative of said start bit;

storing, in a latch, data corresponding to the signal tap at which said signal transition was located in each said tapped delay line at a predefined time during a cycle of said read clock signal;

outputting one of said delayed digital signals from each of said tapped delay lines in accordance with said stored data; and storing new data in said latch as each new burst of digital data signals is received;

whereby said data signals output by said outputting step are synchronized with said read clock signal and with each other.

4. A method of deskewing N parallel digital data signals that are transmitted in bursts, each burst beginning with a predefined start bit in each said parallel digital data signal, the steps of the method comprising:

generating a latch clock signal and a read clock signal that is synchronized with said latch clock signal;

receiving said N parallel digital data signals, where N is a positive integer greater than one; processing each received digital data signal by:

transmitting said received digital data signal through a chain of J delay elements, said chain of J delay elements generating J delayed digital signals Data(i), for i=1 to J, at signal taps located after each of said delay elements;

latching said J delayed digital signals Data(i) at a predefined time during each cycle of said latch clock signal, thereby generating J latched digital signals LData(i);

comparing said latched digital signals LData(i) with the latched digital signals LData(i+1) for i=1 to J−1, generating J−1 comparison signals C(i); wherein when said predefined start bit is received and latched, one of said comparison signals will have a predefined value distinct from all the other ones of said comparison signals; and outputting one of said data signals Data(i) in accordance with the one of said comparison signals having said predefined value; and inhibiting generation of said latch clock signal after said predefined start bit has been received by all of said deskewing buffers;

whereby said data signals output by said outputting step are synchronized with said read clock signal and with each other.

* * * * *